(12) United States Patent
Song

(10) Patent No.: US 7,686,494 B2
(45) Date of Patent: Mar. 30, 2010

(54) BACKLIGHT ASSEMBLY OF LIQUID CRYSTAL DISPLAY

(75) Inventor: Young Ki Song, Icheon-Shi (KR)

(73) Assignee: Hydis Technologies Co., Ltd., Gyeonggi-Do (KR)

( * ) Notice: Subject to any disclaimer, the term of this patent is extended or adjusted under 35 U.S.C. 154(b) by 19 days.

(21) Appl. No.: 11/498,534

(22) Filed: Aug. 3, 2006

(65) Prior Publication Data

US 2007/0035967 A1 Feb. 15, 2007

(30) Foreign Application Priority Data

| Aug. 4, 2005 | (KR) | ...................... 10-2005-0071453 |
| Jul. 25, 2006 | (KR) | ...................... 10-2006-0069855 |

(51) Int. Cl.
*F21V 7/04* (2006.01)

(52) U.S. Cl. .................. 362/612; 362/613; 362/621

(58) Field of Classification Search ................ 362/621, 362/616, 615, 628, 622, 612, 613; 349/62, 349/65
See application file for complete search history.

(56) References Cited

U.S. PATENT DOCUMENTS

| 5,709,447 | A  | * | 1/1998  | Murakami et al. ........... 362/621 |
| 5,890,796 | A  | * | 4/1999  | Marinelli et al. ............. 362/307 |
| 6,215,409 | B1 | * | 4/2001  | Blach ....................... 340/815.4 |
| 6,561,660 | B2 | * | 5/2003  | Huang .......................... 362/27 |
| 6,607,297 | B2 | * | 8/2003  | Egawa ......................... 362/551 |
| 6,752,504 | B2 | * | 6/2004  | Lee et al. ...................... 362/27 |
| 6,817,726 | B2 | * | 11/2004 | Nowak ........................ 362/628 |
| 6,871,973 | B2 | * | 3/2005  | Ju ............................... 362/26 |
| 7,090,388 | B2 | * | 8/2006  | Yagi et al. .................... 362/625 |
| 7,123,316 | B1 | * | 10/2006 | Yang et al. ..................... 349/65 |
| 7,139,048 | B2 | * | 11/2006 | Han et al. ...................... 349/62 |
| 7,275,850 | B2 | * | 10/2007 | Nesterenko et al. .......... 362/609 |
| 7,309,154 | B2 | * | 12/2007 | Ohkawa ...................... 362/615 |
| 2003/0048628 | A1 |   | 3/2003  | Lee et al. |
| 2004/0212981 | A1 | * | 10/2004 | Wang et al. .................... 362/31 |
| 2004/0223314 | A1 | * | 11/2004 | Ching-Huang et al. ........ 362/31 |
| 2005/0001952 | A1 |   | 1/2005  | Han et al. |
| 2005/0201120 | A1 |   | 9/2005  | Nesterenko et al. |
| 2006/0039166 | A1 | * | 2/2006  | Blach .......................... 362/606 |
| 2006/0109684 | A1 | * | 5/2006  | Nesterenko et al. ......... 362/610 |
| 2006/0171168 | A1 | * | 8/2006  | Cheng et al. ................. 362/628 |
| 2006/0203511 | A1 | * | 9/2006  | Tseng .......................... 362/608 |

FOREIGN PATENT DOCUMENTS

| CN | 1407384 A | 4/2003 |
| CN | 1577005 A | 2/2005 |
| JP | 10-2002-0041479 | 6/2002 |
| JP | 2004-227963 | 8/2004 |
| KR | 2005-0105823 | 8/2005 |

\* cited by examiner

*Primary Examiner*—Gunyoung T Lee
(74) *Attorney, Agent, or Firm*—The Webb Law Firm

(57) ABSTRACT

A backlight assembly having a plurality of light emitting diodes (LEDs) and a light guide plate for uniformly guiding light emitted from the LEDs to a liquid crystal substrate is provided. The backlight assembly includes a reflective structure having at least one reflective surface facing the LEDs and tilted at a constant angle. The light emitted from the LEDs is reflected by the reflective surface to have the shape of light emitted from a line light source and be incident on the light guide plate. In effect, hot spots degrading screen quality and screen brightness distribution non-uniformity can be prevented.

27 Claims, 15 Drawing Sheets (a)  (b)

(a)

(b)

(c)

(d)

(e)

(f)

(g)

(h)

BACKLIGHT ASSEMBLY OF LIQUID CRYSTAL DISPLAY

BACKGROUND OF THE INVENTION

1. Field of the Invention

The present invention relates to a backlight assembly, and more particularly, to a backlight assembly of a liquid crystal display capable of enhancing screen brightness distribution uniformity as well as screen quality.

2. Description of the Related Art

Various types of flat panel displays which are considerably lighter and less bulky than Cathode Ray Tubes (CRTs) have recently been developed. Such flat panel displays include a liquid crystal display (LCD), a field emission display (FED), a plasma display panel (PDP), an electro-luminescence (EL) display and so forth. In the field of flat panel displays, a great deal of research has been conducted into enhancing display quality and implementing a large screen.

Among the flat panel displays, the LCD is a non-emissive display using a light source such as a lamp to represent an image. The LCD has advantages of small size, light weight, and low power consumption, and uses electrical and optical properties of a liquid crystal injected into an LCD panel to display information.

The LCD, unlike the CRT, needs a separate device for radiating light onto the LCD panel, i.e., a backlight module, because the liquid crystal material injected between a Thin Film Transistor (TFT) substrate and a color filter substrate is not self-emissive but rather non-emissive, that is, the liquid crystal material merely adjusts an amount of externally incoming light to display it on a screen.

According to the conventional art, an LCD backlight module having high energy efficiency and a long lifetime is disclosed in Korean Patent Publication No. 2005-105823 entitled "Backlight Module Using LED for LCD."

FIG. 1 is a disassembled perspective view of an LCD backlight module using a light emitting diode (LED) of the conventional art. An LCD backlight module 1 using the LED includes a light source 10, a light guide plate 32, a diffusing plate 34, and a prism sheet 50. The light source 10 is composed of a substrate 12 and a plurality of LEDs 14.

Here, the LEDs 14 are mounted on the substrate 12 in a single row or plural rows and are electrically connected to an external power source.

Meanwhile, the substrate 12 on which the LEDs 14 are mounted is inserted into and fixed to a light source cover 16. A connection groove 16a is formed in a longitudinal direction of the light source cover 16 on its inner surface, so that the substrate 12 can be inserted into and fixed to the connection groove 16a.

The light guide plate 32 acts to receive light generated from the LEDs 14 of the light source 10 and disperse the light toward the entire top surface.

The diffusing plate 34 is disposed on the light guide plate 32 and acts to uniformly distribute light transmitted through the light guide plate 32.

The prism sheet 50 composed of first and second prism sheets 52 and 54 is disposed on the diffusing plate 34, and induces light from the diffusing plate 34 into a predetermined region (i.e., an image formation region) of the LCD panel. A protective sheet 56 for protecting the prism sheet 50 may be disposed on the prism sheet 50.

Meanwhile, the LED 14 of the conventional LCD backlight module 1 described above is made of point light source shaped LEDs 14. Thus, for an LCD requiring a surface light source for screen display, light emitted from the LEDs 14 must be converted into light of a surface light source through the light guide plate 32.

However, the LEDs 14, being point light sources, do not emit much light at wide angles, but rather emit most of their light at the positions where they are disposed. Thus, a portion of an LED in contact with the light guide plate 32 has bright spots with a hot spot shape and the remaining portions are less bright. This degrades screen brightness distribution uniformity and the overall quality of an image displayed on the screen of the LCD.

SUMMARY OF THE INVENTION

The present invention provides a backlight assembly of an LCD capable of enhancing screen quality by reflecting light emitted from LEDs through at least one reflective structure and allowing light of a line light source shape to be incident on a light guide plate.

The present invention also provides a backlight assembly of an LCD capable of effectively preventing hot spots which cause non-uniformity of screen brightness distribution.

In a first aspect, the invention is directed to a backlight assembly having a plurality of LEDs and a light guide plate for uniformly guiding light emitted from the LEDs to a liquid crystal substrate. The backlight assembly comprises a reflective structure having at least one reflective surface facing the LEDs and tilted at a constant angle. The light emitted from the LEDs is reflected by the reflective surface to have the shape of light emitted from a line light source and be incident on the light guide plate.

In this case, a pair of LEDs, and a reflective structure having two reflective surfaces disposed between the LEDs, facing the LEDs, and tilted at a constant angle may constitute one group, and at least one group may be disposed.

At least one set consisting of an LED and a reflective structure having a reflective surface tilted at a constant angle may be symmetrically disposed at opposite sides of the longitudinal bisector of the light guide plate.

A light receiving surface of the light guide plate may have the same shape as the reflective surface of the reflective structure and may be disposed close to the reflective surface.

A light receiving surface of the light guide plate may have a plurality of "V"-shaped grooves which are spaced apart from each other by a constant interval to further increase the divergence of light emitted from the LEDs by means of a scattering effect.

In a second aspect, the invention is directed to a backlight assembly having a plurality of LEDs and a light guide plate for uniformly guiding light emitted from the LEDs to a liquid crystal substrate. The backlight assembly comprises one group consisting of a pair of LEDs facing each other and a reflective structure having two reflective surfaces disposed between the LEDs, facing the LEDs, and tilted at a constant angle. The one group is disposed at opposite sides of the longitudinal bisector of the light guide plate as a reference, and the light emitted from the LEDs is reflected by the reflective surfaces to have the shape of light emitted from a line light source and be incident on the light guide plate.

In a third aspect, the invention is directed to a backlight assembly having a plurality of LEDs and a light guide plate for uniformly guiding light emitted from the LEDs to a liquid crystal substrate. The backlight assembly comprises one group consisting of a pair of LEDs facing each other and a first reflective structure having two reflective surfaces disposed between the LEDs, facing the LEDs, and tilted at a constant angle; and one set symmetrically disposed at opposite sides of the group as a reference and consisting of one LED and a second reflective structure having a reflective surface tilted at a constant angle. Here, the bisector of the first reflective structure matches the longitudinal bisector of the light guide plate, and the light emitted from the LEDs is reflected by the reflective surface to have the shape of light emitted from a line light source and be incident on the light guide plate.

In a fourth aspect, the invention is directed to a backlight assembly having a plurality of LEDs and a light guide plate for uniformly guiding light emitted from the LEDs to a liquid crystal substrate. The backlight assembly comprises at least one set symmetrically disposed at opposite sides of longitudinal bisector of the light guide plate, each set consisting of an LED and a reflective structure having a reflective surface facing the LED and tilted at a constant angle. Here, the light emitted from the LEDs is reflected by the reflective surface to have the shape of light emitted from a line light source and be incident on the light guide plate.

DETAILED DESCRIPTION OF THE INVENTION

Figure 1:
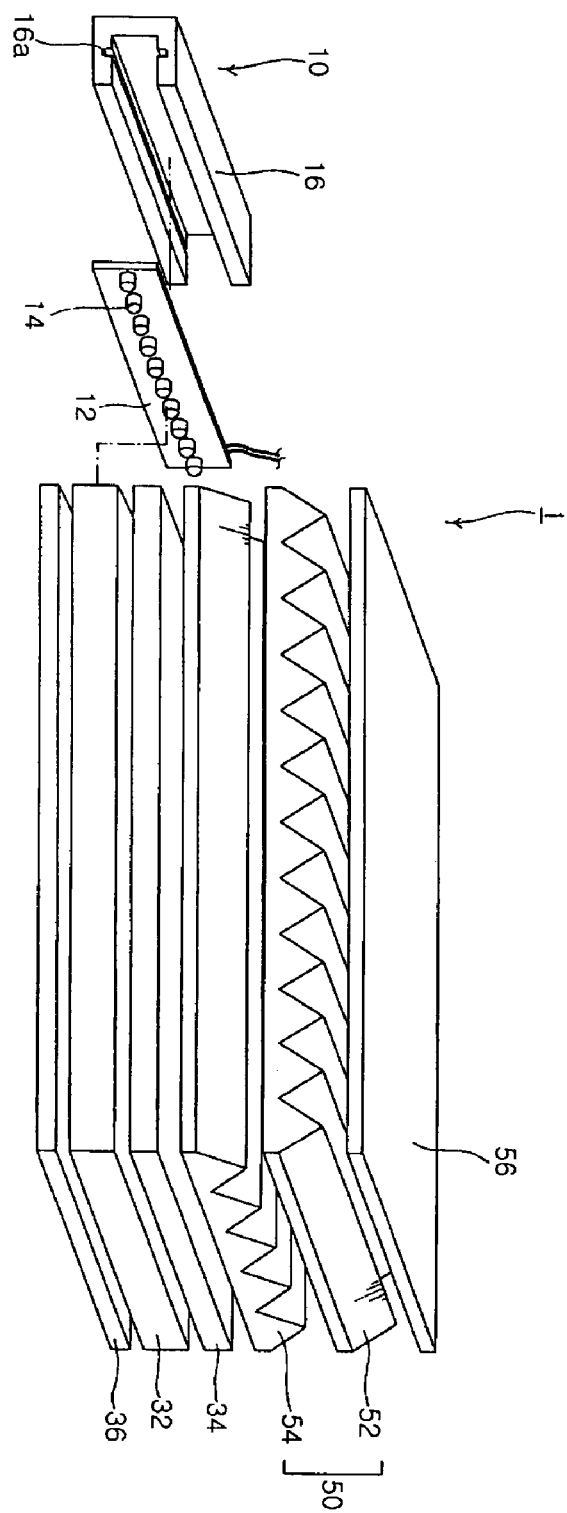
FIG. 1 is a disassembled perspective view of a conventional LCD backlight module using LEDs.

The present invention will now be described more fully hereinafter with reference to the accompanying drawings, in which exemplary embodiments of the invention are shown. This invention may, however, be embodied in different forms and should not be construed as limited to the exemplary embodiments set forth herein. Rather, these exemplary embodiments are provided so that this disclosure will be thorough and complete, and will fully convey the scope of the invention to those skilled in the art. Like numbers refer to like elements throughout the specification and drawings.

First, a diffusing plate or a prism sheet of a backlight module is not a central feature of the exemplary embodiments of the present invention, and thus is not described in detail below or illustrated in the drawings.

First Exemplary Embodiment

Figure 2:
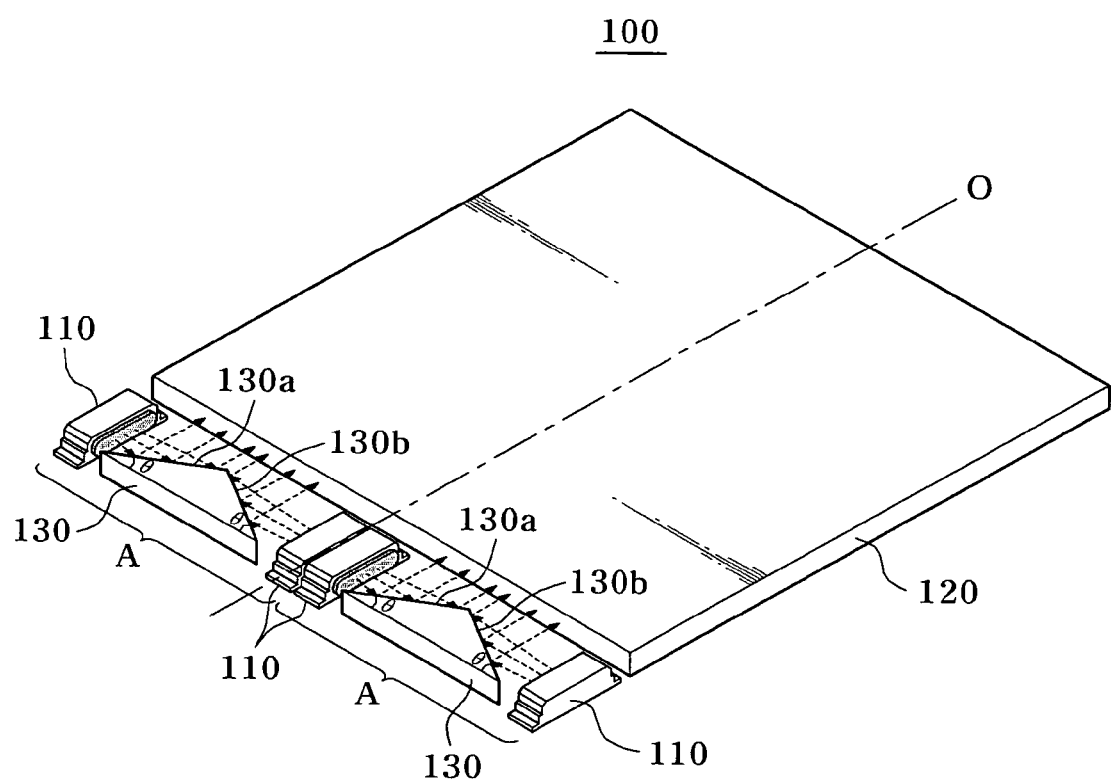
FIG. 2 is a perspective view of a backlight assembly of an LCD in accordance with a first exemplary embodiment of the present invention.

FIG. 2 is a perspective view of a backlight assembly of an LCD in accordance with a first exemplary embodiment of the present invention.

Referring to FIG. 2, a backlight assembly 100 of an LCD according to the first exemplary embodiment of the present invention includes a plurality of LEDs 110, a light guide plate 120 disposed at one side of the LEDs 110, and at least one reflective structure 130 disposed to face the LEDs 110.

In this case, the LEDs 110 are disposed at one side of the light guide plate 120 and emit light vertically in the light guide plate 120, i.e., in its width direction. Light emitted from the LEDs 110 preferably exits toward the reflective structure 130 in a radial direction.

The light guide plate 120 converts light of a point light source shape emitted from the LEDs 110 into light of a surface light source shape and guides the light uniformly toward a liquid crystal substrate (not shown) for displaying an image on a screen.

The reflective structure 130 has two reflective surfaces 130a and 130b tilted at a constant angle (θ) (preferably, about 30° to about 55°), and acts to reflect light emitted from the LEDs 110 by means of the two reflective surfaces 130a and 130b in the shape of light emitted from a line light source toward the light guide plate 120.

Figure 14:
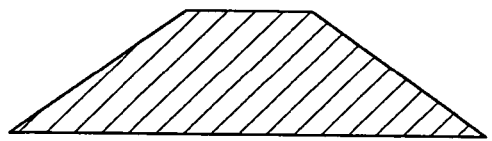
FIG. 14 is a cross-sectional view of other examples of a reflective structure in accordance with exemplary embodiments of the present invention.
Figure 14:
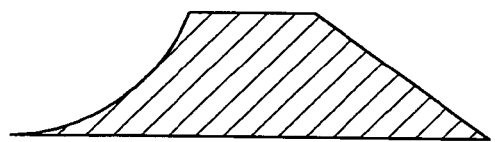
Figure 14:
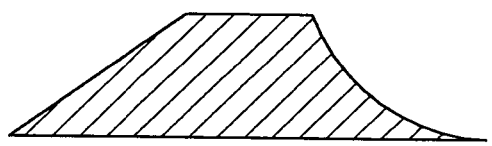
Figure 14:
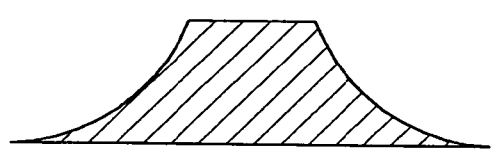
Figure 14:
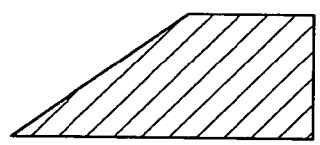
Figure 14:
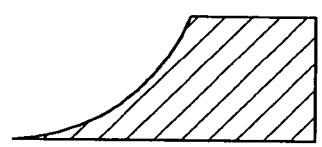
Figure 14:
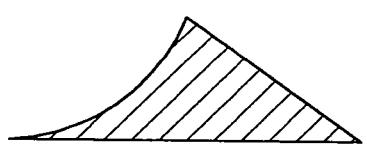
Figure 14:

The shape of the reflective structure 130 is, for example, an isosceles triangular pillar where the two reflective surfaces 130a and 130b are preferably in end-to-end contact with each other, but various other shapes such as a plate shape are also possible (see FIG. 14).

By way of example, when the reflective structure 130 has a plate shape, cross-sections of the two reflective surfaces 130a and 130b may look like  where the two reflective surfaces 130a and 130b in end-to-end contact with each other, or cross-sections of the two reflective surfaces 130a and 130b facing the LEDs 110 may be  or  where the two reflective surfaces are not in contact with each other.

According to the backlight assembly 100 of the LCD of the first exemplary embodiment of the present invention, light emitted from the LEDs 110 is reflected by the two reflective surfaces 130a and 130b of the reflective structure 130, thereby converted from a point light source shape into a line light source shape, and incident on the light guide plate 120. Thus, the backlight assembly 100 of the LCD of the first exemplary embodiment of the present invention is capable of effectively preventing hot spots causing screen brightness distribution non-uniformity and deteriorating overall screen quality.

An arrangement of the LEDs 110 and the reflective structure 130 of the backlight assembly 100 of an LCD according to the first exemplary embodiment of the present invention will be described in detail below.

As shown in FIG. 2, a group A consisting of a pair of LEDs 110 facing each other, and a reflective structure 130 having two reflective surfaces 130a and 130b disposed between and tilted at an angle facing the LEDs, is horizontally disposed at opposite sides of the light guide plate with the longitudinal bisector O of the light guide plate 120 as a reference.

The groups A are preferably disposed close to each other, however they may be spaced apart from each other by a constant interval, and other arrangements are possible as well.

Meanwhile, the group A is horizontally disposed at opposite sides of the light guide plate with the longitudinal bisector O of the light guide plate 120 as a reference in the first exemplary embodiment of the present invention. However, depending on the size of the light guide plate 120, a plurality of groups A may be horizontally disposed at opposite sides of the light guide plate with the longitudinal bisector O of the light guide plate 120 as a reference. Other arrangements are possible as well.

Figure 3:
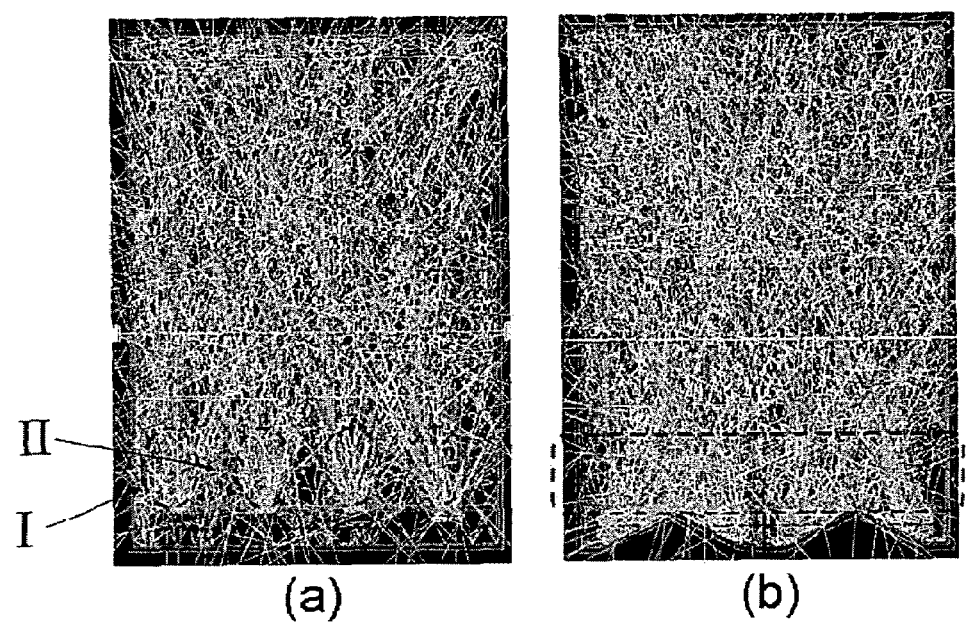
FIG. 3 illustrates simulation results comparing the backlight assembly of an LCD according to the first exemplary embodiment of the present invention with conventional art.

FIG. 3 illustrates simulation results comparing the backlight assembly of an LCD according to the first exemplary embodiment of the present invention with conventional art. The simulation used a typical optical simulation tool called Stiffened polytropic EOS (SPEOS).

Referring to FIG. 3, (a) illustrates simulation results when the backlight assembly of the LCD of the conventional art is applied. In (a), portions where the LEDs 14 and the light guide plate 32 (see FIG. 1) are in contact with each other, i.e., bright portions I of a hot spot shape, are brighter than other portions, i.e., dark portions II between the LEDs 14.

(b) of FIG. 3 illustrates simulation results when the backlight assembly 100 (see FIG. 2) of an LCD of the first exemplary embodiment of the present invention is applied. In (b), the bright portions I of a hot spot shape and the dark portions II are remarkably reduced and light propagation is more uniform than in (a). Therefore, screen brightness distribution uniformity as well as screen quality can be enhanced.

Second Exemplary Embodiment

Figure 4:
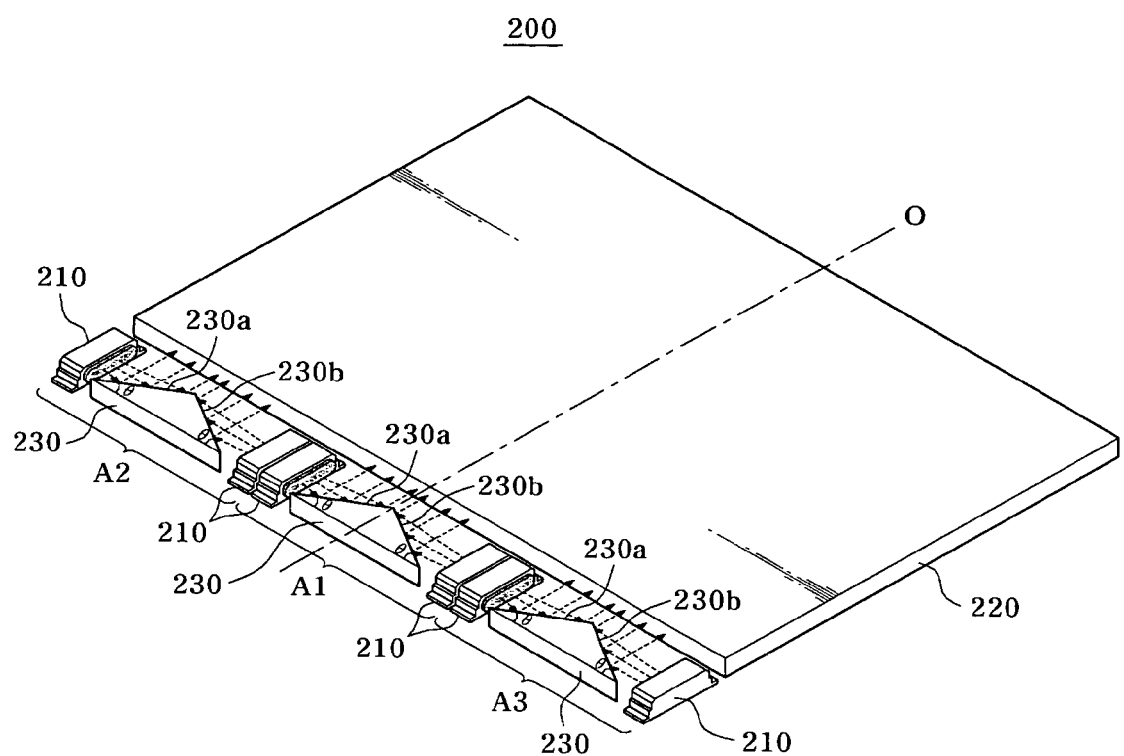
FIG. 4 is a perspective view of a backlight assembly of an LCD in accordance with a second exemplary embodiment of the present invention.

FIG. 4 is a perspective view of a backlight assembly of an LCD in accordance with a second exemplary embodiment of the present invention.

Referring to FIG. 4, a backlight assembly 200 of an LCD according to the second exemplary embodiment of the present invention includes a plurality of LEDs 210, a light guide plate 220 disposed at one side of the LEDs 210, and at least one reflective structure 230 disposed to face the LEDs 210.

In this case, the LEDs 210, the light guide plate 220, and the reflective structure 230 of the second exemplary embodiment of the present invention are the same as the LEDs 110, the light guide plate 120, and the reflective structure 130 of the first exemplary embodiment described in detail above.

The second exemplary embodiment differs from the first exemplary embodiment in arrangement of the LEDs 110 and the reflective structure 130. Therefore, the arrangement of the LEDs 210 and the reflective structure 230 of the backlight assembly 200 of the LCD according to the second exemplary embodiment will be described in detail.

As shown in FIG. 4, a plurality of groups A1 to A3 are horizontally disposed at one side of the light guide plate 220. Each of the groups A1 to A3 is composed of a pair of LEDs 210 facing each other, and a reflective structure 230 having two reflective surfaces 230a and 230b disposed between and tilted at an angle facing the LEDs 210.

Any one group A1 of the groups A1 to A3 has the bisector of its reflective structure 230 matching the longitudinal bisector O of the light guide plate 220, and other groups A2 and A3 are horizontally and symmetrically disposed at both sides of the group A1 as a reference.

The groups A1 to A3 are preferably disposed close to each other, however they may be spaced apart from each other by a constant interval, and other arrangements are possible as well.

While the groups A2 and A3 are horizontally and symmetrically disposed at both sides of the group A1 as a reference in the second exemplary embodiment of the present invention, depending on the size of the light guide plate 120, a plurality of groups may be horizontally disposed at opposite sides of the group A1 as a reference. Other arrangements are possible as well.

Third Exemplary Embodiment

Figure 5:
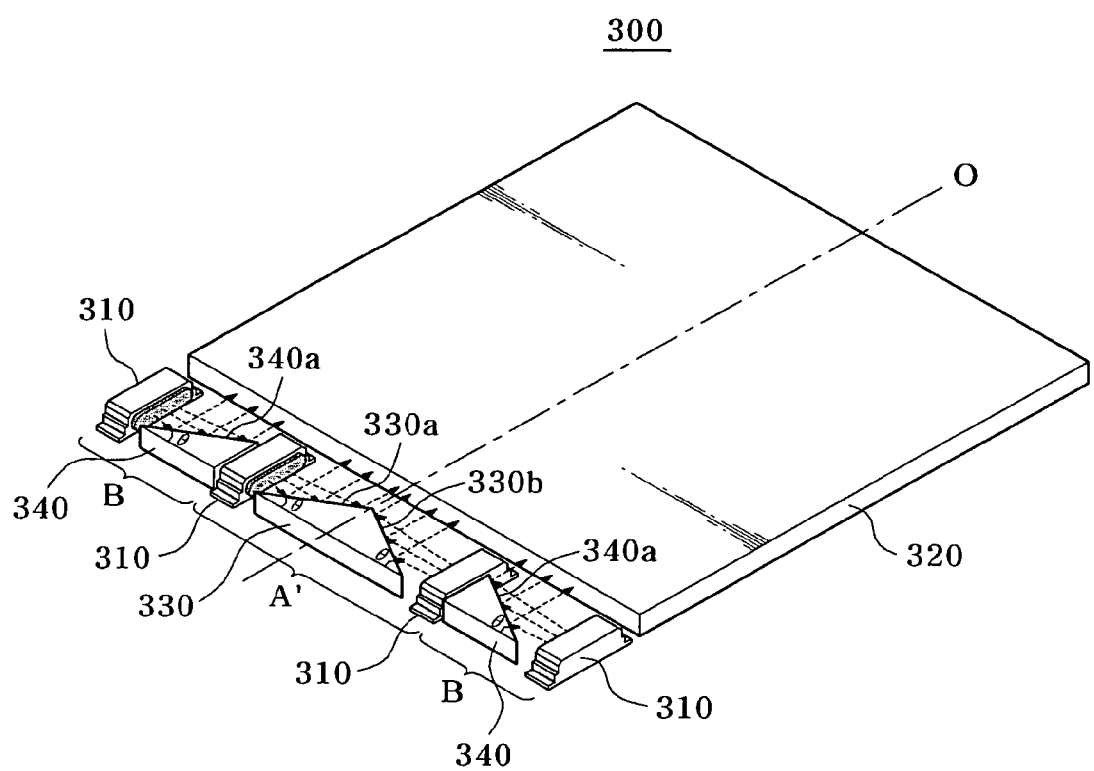
FIG. 5 is a perspective view of a backlight assembly of an LCD in accordance with a third exemplary embodiment of the present invention.

FIG. 5 is a perspective view of a backlight assembly of an LCD in accordance with a third exemplary embodiment of the present invention.

Referring to FIG. 5, a backlight assembly 300 of an LCD according to the third exemplary embodiment of the present invention includes a plurality of LEDs 310, a light guide plate 320 disposed at one side of the LEDs 310, and a first reflective structure 330 and at least one second reflective structure 340 facing the LEDs 310.

In this case, the LEDs 310, the light guide plate 320, and the first reflective structure 330 of the third exemplary embodiment of the present invention are the same as the LEDs 110, the light guide plate 120, and the reflective structure 130 of the first exemplary embodiment described in detail above.

The second reflective structure 340 has one reflective surface 340a tilted at a constant angle ($\theta$) (preferably, about 30° to about 55°), and acts to reflect light emitted from the LED 310 by means of the reflective surface 340a in the shape of light emitted from a line light source toward the light guide plate 320.

The shape of the second reflective structure 340 is, for example, a rectangular triangular pillar, but various other shapes including a plate shape are also possible (see FIG. 14).

By way of example, when the second reflective structure 340 has a plate shape, its cross-section may look like 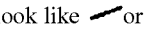 or 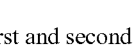 so as to face the LEDs 310.

An arrangement of the LEDs 310 and the first and second reflective structures 330 and 340 of the backlight assembly 300 of an LCD according to the third exemplary embodiment of the present invention will be described in detail below.

As shown in FIG. 5, a group A' consists of a pair of LEDs 310 facing each other, and a first reflective structure 330 having two reflective surfaces 330a and 330b disposed between and tilted at an angle facing the LEDs 310. Here, the bisector of the first reflective structure 330 disposed in the group A' matches the longitudinal bisector O of the light guide plate 320.

Also, one set B consisting of one LED 310 and a second reflective structure 340 having one reflective surface 340a tilted at a constant angle is horizontally and symmetrically disposed at opposite sides of the group A' as a reference.

In this case, light emitted from the LEDs 310 is directed toward the longitudinal bisector O of the light guide plate 320.

The group A' and the set B are preferably disposed close to each other, however may be spaced apart from each other by a constant interval, and other arrangements are possible as well.

The set B is horizontally and symmetrically disposed at opposite sides of the group A' as a reference in the third exemplary embodiment of the present invention. However, depending on the size of the light guide plate 320, a plurality of sets B may be horizontally disposed at opposite sides of the group A' as a reference.

Figure 6:
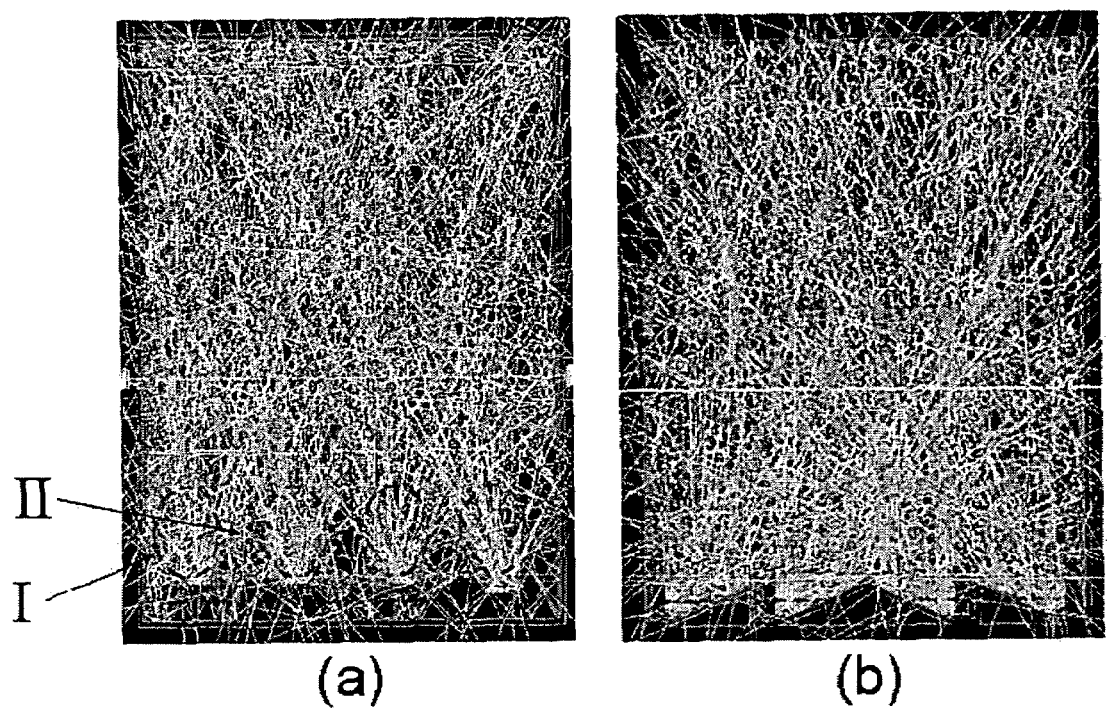
FIG. 6 illustrates simulation results comparing the backlight assembly of an LCD according to the third exemplary embodiment of the present invention with conventional art.

FIG. 6 illustrates simulation results comparing the backlight assembly of an LCD according to the third exemplary embodiment of the present invention with conventional art. The simulation used the typical optical simulation tool called SPEOS.

Referring to FIG. 6, (a) illustrates simulation results when the backlight assembly of the LCD of the conventional art is applied, wherein portions where the LEDs 14 and the light guide plate 32 (see FIG. 1) are in contact with each other, i.e., bright portions I of a hot spot shape, are brighter than other portions, i.e., dark portions II between the LEDs 14.

(b) of FIG. 3 illustrates simulation results when the backlight assembly 300 (see FIG. 5) of the LCD of the third exemplary embodiment of the present invention is applied. In (b), the bright portions I of a hot spot shape and the dark portions II are remarkably reduced and light propagation is more uniform than in (a). Therefore, screen brightness distribution uniformity as well as screen quality can be enhanced.

Fourth Exemplary Embodiment

Figure 7:
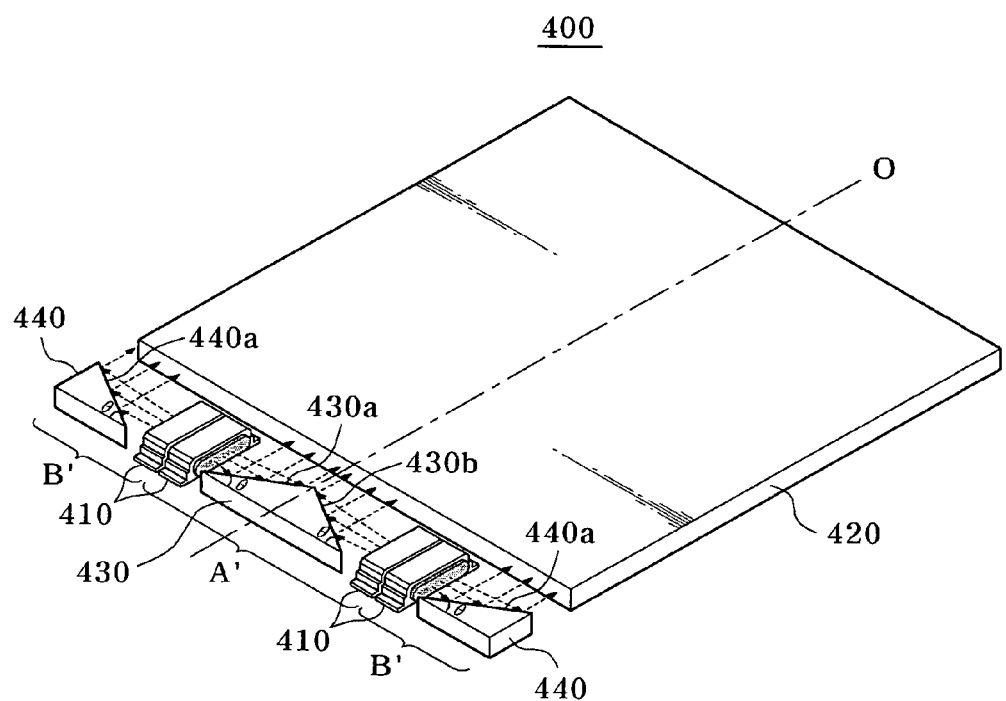
FIG. 7 is a perspective view of a backlight assembly of an LCD in accordance with a fourth exemplary embodiment of the present invention.

FIG. 7 is a perspective view of a backlight assembly of an LCD in accordance with a fourth exemplary embodiment of the present invention.

Referring to FIG. 7, a backlight assembly 400 of an LCD according to the fourth exemplary embodiment of the present invention includes a plurality of LEDs 410, a light guide plate 420 disposed at one side of the LEDs 410, and a first reflective structure 430 and at least one second reflective structure 440 facing the LEDs 410.

In this case, the LEDs 410, the light guide plate 420, and the first and second reflective structures 430 and 440 of the fourth exemplary embodiment of the present invention are the same as the LEDs 310, the light guide plate 320, and the first and second reflective structure 330 and 340 of the third exemplary embodiment described in detail above.

The fourth exemplary embodiment differs from the third exemplary embodiment in an arrangement of the second reflective structure 340. Therefore, the arrangement of the LEDs 410 and the first and second reflective structures 430 and 440 of the backlight assembly 400 of the LCD according to the fourth exemplary embodiment will be described in detail.

As shown in FIG. 7, a group A' consists of a pair of LEDs 410 facing each other, and a first reflective structure 430 having two reflective surfaces 430a and 430b disposed between and tilted at an angle facing the LEDs 410. And, the bisector of the first reflective structure 430 disposed in the group A' matches the longitudinal bisector O of the light guide plate 420.

Also, one set B' consisting of one LED 410 and a second reflective structure 440 having one reflective surface 440a tilted at a constant angle is horizontally and symmetrically disposed at opposite sides of the group A' as a reference.

In this case, the LEDs 410 of the group A' are disposed to emit light toward the longitudinal bisector O of the light guide plate 420, and the LEDs 410 of the set B' are disposed to emit light in the opposite direction to the light emitted from the LEDs 410 of the group A'.

The group A' and the set B' are preferably disposed close to each other, however may be spaced apart from each other by a constant interval, and other arrangements are possible as well.

The set B' is horizontally and symmetrically disposed at opposite sides of the group A' as a reference in the fourth exemplary embodiment of the present invention. However, depending on the size of the light guide plate 420, a plurality of sets B' may be horizontally disposed at opposite sides of the group A' as a reference. And, other arrangements are possible as well.

Fifth Exemplary Embodiment

Figure 8:
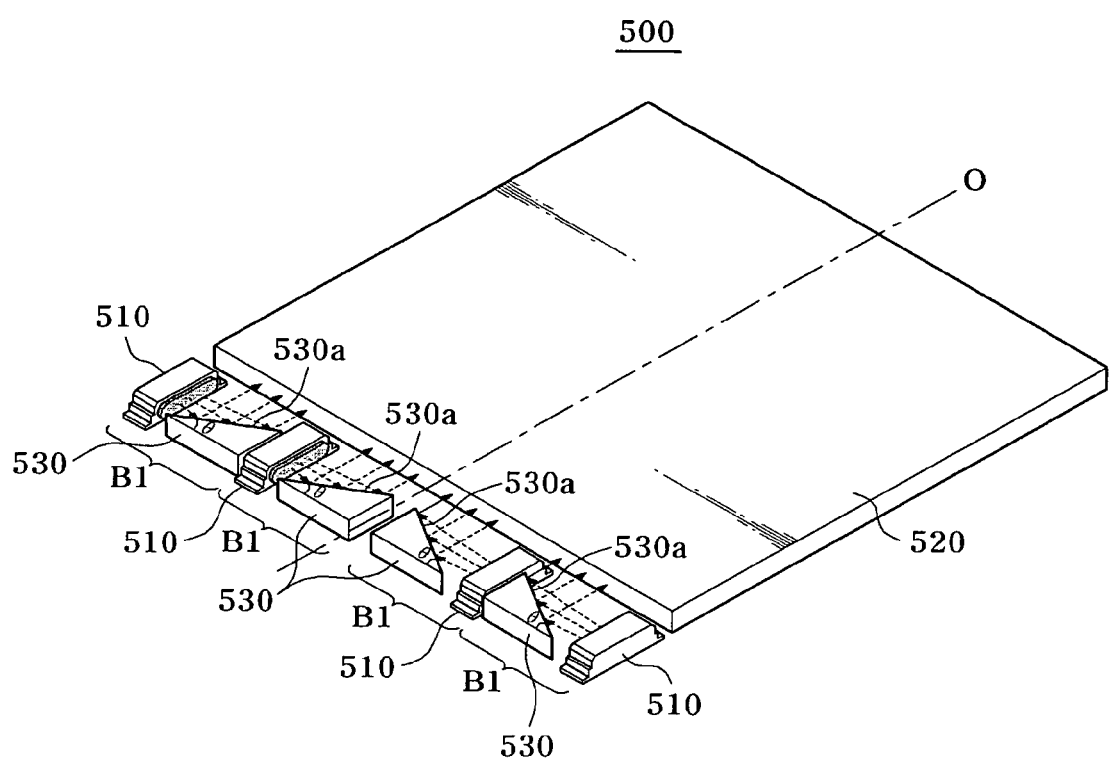
FIG. 8 is a perspective view of a backlight assembly of an LCD in accordance with a fifth exemplary embodiment of the present invention.

FIG. 8 is a perspective view of a backlight assembly of an LCD in accordance with a fifth exemplary embodiment of the present invention.

Referring to FIG. 8, a backlight assembly 500 of an LCD according to the fifth exemplary embodiment of the present invention includes a plurality of LEDs 510, a light guide plate 520 disposed at one side of the LEDs 510, and at least one reflective structure 530 disposed to face the LEDs 510.

In this case, the LEDs 510, the light guide plate 520, and the reflective structure 530 of the fifth exemplary embodiment of the present invention are the same as the LEDs 310, the light guide plate 320, and the second reflective structure 340 of the third exemplary embodiment described in detail above.

An arrangement of the LEDs 510 and the reflective structure 530 of the backlight assembly 500 of the LCD according to the fifth exemplary embodiment of the present invention will be described in detail below.

As shown in FIG. 8, two sets B1, each consisting of an LED 510 and a reflective structure 530 having a reflective surface 530a tilted at a constant angle, are horizontally and symmetrically disposed at opposite sides of the longitudinal bisector O of the light guide plate 520.

In this case, light emitted from the LEDs 510 of the set B1 is directed toward the longitudinal bisector O of the light guide plate 520.

The sets B1 are preferably disposed close to each other, however may be spaced apart from each other by a constant interval, and other arrangements are possible as well.

Meanwhile, two sets B1 are horizontally disposed at opposite sides of the light guide plate 520 with the longitudinal bisector O of the light guide plate 520 as a reference in the fifth exemplary embodiment of the present invention. However, depending on the size of the light guide plate 520, a plurality of sets B may be horizontally disposed at opposite sides of the light guide plate 520 with the longitudinal bisector O of the light guide plate 520 as a reference. Other arrangements are possible as well.

Sixth Exemplary Embodiment

Figure 9:
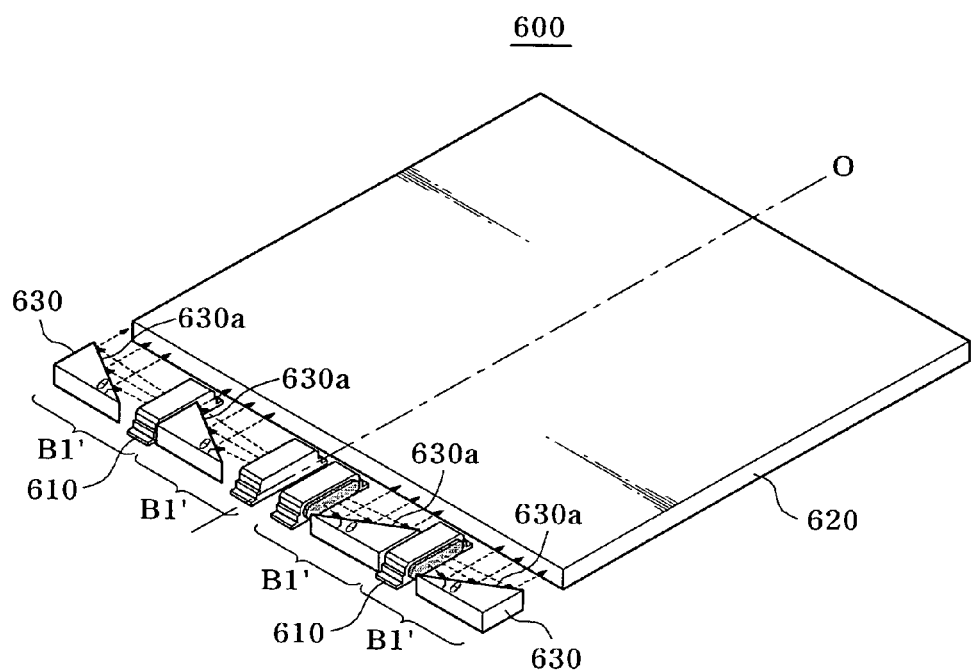
FIG. 9 is a perspective view of a backlight assembly of an LCD in accordance with a sixth exemplary embodiment of the present invention.

FIG. 9 is a perspective view of a backlight assembly of an LCD in accordance with a sixth exemplary embodiment of the present invention.

Referring to FIG. 9, a backlight assembly 600 of an LCD according to the sixth exemplary embodiment of the present invention includes a plurality of LEDs 610, a light guide plate 620 disposed at one side of the LEDs 610, and at least one reflective structure 630 facing the LEDs 610.

In this case, the LEDs 610, the light guide plate 620, and the reflective structure 630 of the sixth exemplary embodiment of the present invention are the same as the LEDs 510, the light guide plate 520, and the reflective structure 530 of the fifth exemplary embodiment described in detail above.

The sixth exemplary embodiment differs from the fifth exemplary embodiment in an arrangement of the LEDs 510 and the reflective structure 530. Therefore, the arrangement of the LEDs 610 and the reflective structure 630 of the backlight assembly 600 of the LCD according to the sixth exemplary embodiment will be described in detail.

As shown in FIG. 9, two sets B1', each consisting of an LED 610 and a reflective structure 630 having a reflective surface 630a tilted at a constant angle, are horizontally and symmetrically disposed at opposite sides of the longitudinal bisector O of the light guide plate 620 as a reference.

In this case, the LEDs 610 of the set B' are disposed to emit light in a direction away from the longitudinal bisector O of the light guide plate 620.

The sets B1' are preferably disposed close to each other, however may be spaced apart from each other by a constant interval, and other arrangements are possible as well.

Meanwhile, two sets B1' are horizontally disposed at opposite sides of the light guide plate 620 with the longitudinal bisector O of the light guide plate 620 as a reference in the sixth exemplary embodiment of the present invention. However, depending on the size of the light guide plate 620, a plurality of sets B1' may be horizontally disposed at opposite sides of the light guide plate 620 with the longitudinal bisector O of the light guide plate 520 as a reference. Other arrangements are possible as well.

Seventh Exemplary Embodiment

Figure 10:
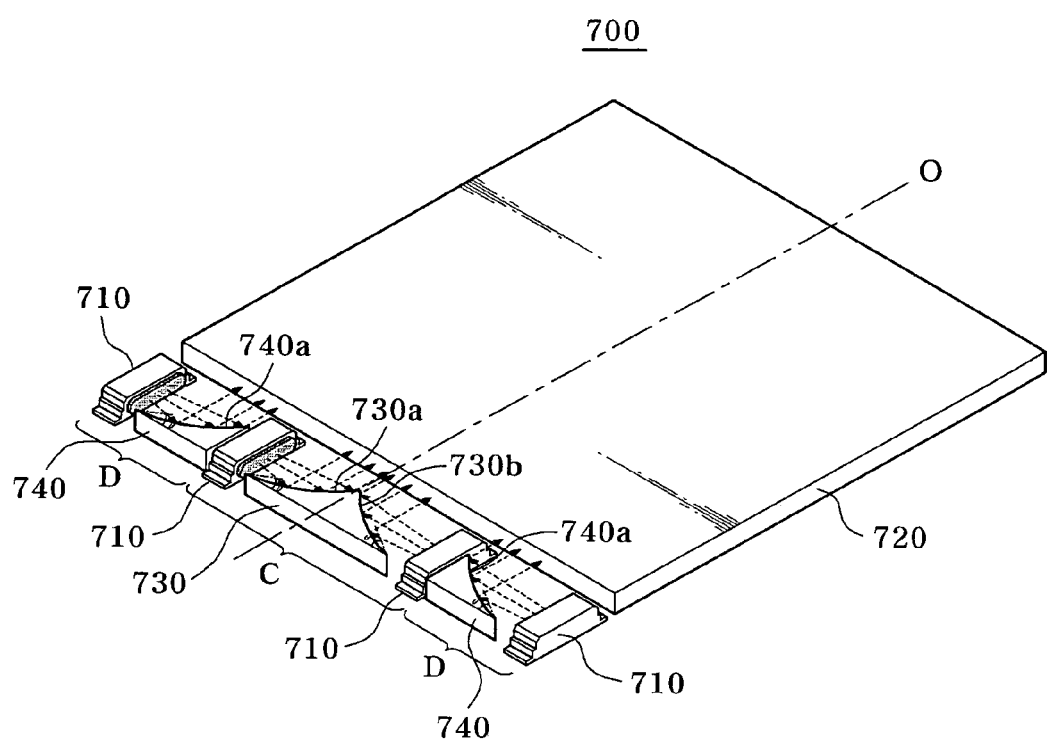
FIG. 10 is a perspective view of a backlight assembly of an LCD in accordance with a seventh exemplary embodiment of the present invention.

FIG. 10 is a perspective view of a backlight assembly of an LCD in accordance with a seventh exemplary embodiment of the present invention.

Referring to FIG. 10, a backlight assembly 700 of an LCD according to the seventh exemplary embodiment of the present invention includes a plurality of LEDs 710, a light guide plate 720 disposed at one side of the LEDs 710, and a first reflective structure 730 and at least one second reflective structure 740 disposed to face the LEDs 710.

In this case, the LEDs 710 and the light guide plate 720 of the seventh exemplary embodiment of the present invention are the same as the LEDs 310 and 410 and the light guide plates 320 and 420 of the third and fourth exemplary embodiments described in detail above.

Also, the first reflective structure 730 has two reflective surfaces 730a and 730b with a predetermined radius of curvature and tilted at a constant angle (θ) (preferably, about 30° to about 55°), and acts to reflect light emitted from the LEDs 710 by means of the two reflective surfaces 730a and 730b in the shape of light emitted from a line light source toward the light guide plate 720.

The shape of the first reflective structure 730 is, for example, a pillar shape such as ⌳ in cross-section, with the two reflective surfaces 730a and 730b having the predetermined radius of curvature in end-to-end contact with each other. However, various other shapes including a plate shape are also possible (see FIG. 14).

By way of example, when the first reflective structure 730 has a plate shape, a cross-section of the two reflective surfaces 730a and 730b having the predetermined radius of curvature may look like ⌳ where the two reflective surfaces are in end-to-end contact with each other. Alternatively, a cross-section of the two reflective surfaces 730a and 730b having the predetermined radius of curvature and facing the LEDs 710 may look like ⌿ and ⌾ where the two reflective surfaces are not in contact with each other.

The second reflective structure 740 has one reflective surface 740a with the predetermined radius of curvature and tilted at a constant angle (θ) (preferably, about 30° to about 55°), and acts to reflect light emitted from the LEDs 710 by means of the reflective surface 740a in the shape of light emitted from a line light source toward the light guide plate 720.

The shape of the second reflective structure 740 is, for example, a pillar shape such as ⌿ in cross-section, but various other shapes including a plate shape are also possible (see FIG. 14).

By way of example, when the second reflective structure 740 has a plate shape, its cross-section may look like ⌿ or ⌾ so as to face the LEDs 710.

That is, the first and second reflective structures 730 and 740 of the seventh exemplary embodiment have a predetermined radius of curvature added to the reflective surfaces of the first and second reflective structures 330 and 340 (430 and 440) of the third and fourth exemplary embodiments, respectively.

An arrangement of the LEDs 710 and the first and second reflective structures 730 and 740 of the backlight assembly 700 of the LCD according to the seventh exemplary embodiment of the present invention will be described in detail below.

As shown in FIG. 10, a group C consists of a pair of LEDs 710 facing each other, and a first reflective structure 730 having two reflective surfaces 730a and 730b with a predetermined radius of curvature and disposed between and tilted at an angle facing the LEDs 710. The bisector of the first reflective structure 730 disposed in the group C matches the longitudinal bisector O of the light guide plate 720.

Also, one set D consisting of one LED 710 and a second reflective structure 740 with a predetermined radius of curvature and tilted at a constant angle is horizontally and symmetrically disposed at opposite sides of the group C as a reference.

In this case, light emitted from the LEDs 710 is directed toward the longitudinal bisector O of the light guide plate 720.

The group C and the set D are preferably disposed close to each other, however may be spaced apart from each other by a constant interval, and other arrangements are possible as well.

Meanwhile, the set D is horizontally and symmetrically disposed at opposite sides with the group C as a reference in the seventh exemplary embodiment of the present invention. However, depending on the size of the light guide plate 720, a plurality of sets D may be horizontally disposed at opposite sides of the group C as a reference. Other arrangements are possible as well.

Figure 11:
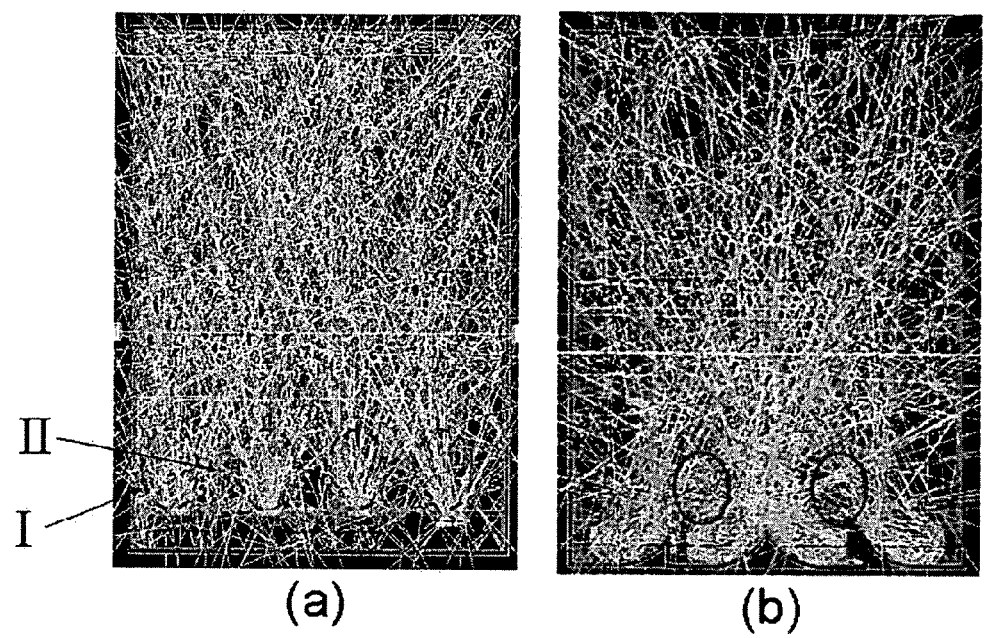
FIG. 11 illustrates simulation results comparing the backlight assembly of an LCD according to the seventh exemplary embodiment of the present invention with conventional art.

FIG. 11 illustrates simulation results comparing the backlight assembly of an LCD according to the seventh exemplary embodiment of the present invention with conventional art. The simulation used the typical optical simulation tool called SPEOS.

Referring to FIG. 11, (a) illustrates simulation results when the backlight assembly of the LCD of the conventional art is applied, wherein portions where the LEDs 14 and the light guide plate 32 (see FIG. 1) are in contact with each other, i.e., bright portions I of a hot spot shape, are brighter than other portions, i.e., dark portions II between the LEDs 14.

(b) of FIG. 11 illustrates simulation results when the backlight assembly 700 (see FIG. 10) of the LCD of the seventh exemplary embodiment of the present invention is applied. In (b), the bright portions I of a hot spot shape and the dark portions II are remarkably reduced and light propagation is more uniform than in (a) of FIG. 11. Therefore, screen brightness distribution uniformity as well as screen quality can be enhanced.

Eighth Exemplary Embodiment

Figure 12:
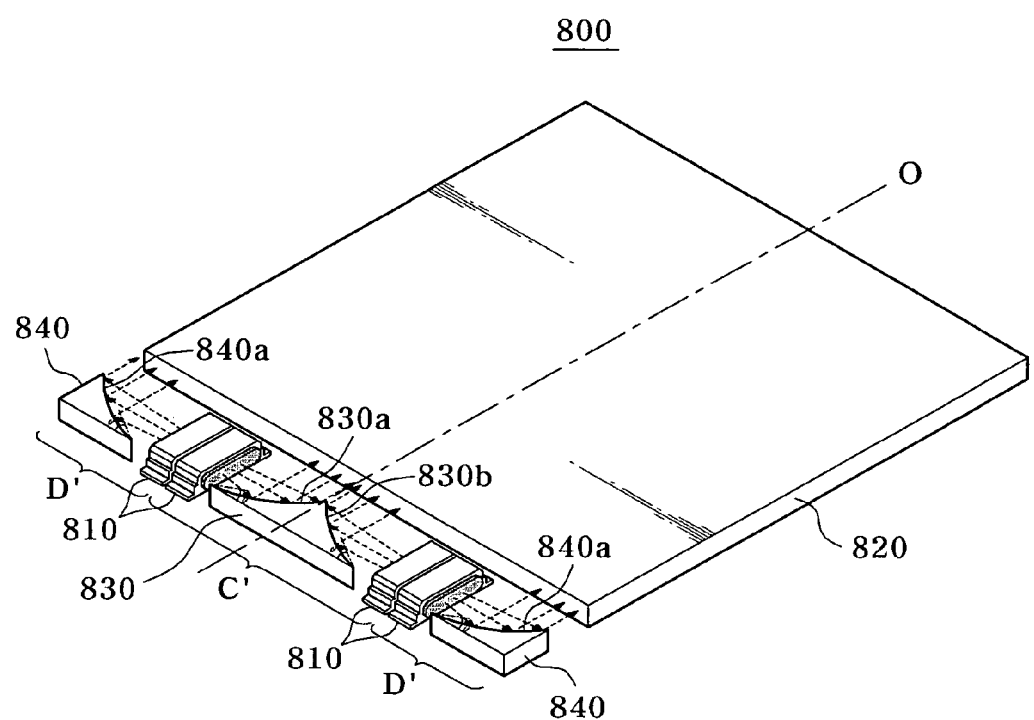
FIG. 12 is a perspective view of a backlight assembly of an LCD in accordance with an eighth exemplary embodiment of the present invention.

FIG. 12 is a perspective view of a backlight assembly of an LCD in accordance with an eighth exemplary embodiment of the present invention.

Referring to FIG. 12, a backlight assembly 800 of an LCD according to the eighth exemplary embodiment of the present invention includes a plurality of LEDs 810, a light guide plate 820 disposed at one side of the LEDs 810, and a first reflective structure 830 and at least one second reflective structure 840 facing the LEDs 810.

In this case, the LEDs 810, the light guide plate 820, and the first and second reflective structures 830 and 840 of the eighth exemplary embodiment of the present invention are the same as the LEDs 710, the light guide plate 720, and the first and second reflective structures 730 and 740 of the seventh exemplary embodiment described in detail above.

The eighth exemplary embodiment differs from the seventh exemplary embodiment in an arrangement of the second reflective structure 740. Therefore, the arrangement of the LEDs 810 and the first and second reflective structures 830 and 840 of the backlight assembly 800 of the LCD according to the eighth exemplary embodiment will be described in detail.

As shown in FIG. 12, a group C' consists of a pair of LEDs 810 facing each other, and a first reflective structure 830 having two reflective surfaces 830a and 830b with a predetermined radius of curvature and disposed between and tilted at an angle facing the LEDs 810. Here, the bisector of the first reflective structure 830 disposed in the group C' matches the longitudinal bisector O of the light guide plate 820.

Also, one set D' consisting of one LED 810 and a second reflective structure 840 with a predetermined radius of curvature and tilted at a constant angle is horizontally and symmetrically disposed at opposite sides of the group C' as a reference.

In this case, light emitted from the LEDs 810 of the group C' is directed toward the longitudinal bisector O of the light guide plate 820, and the LEDs 810 of the set D' are disposed to emit light in the opposite direction to the light emitted from the LEDs 810 of the group C'.

The group C' and the set D' are preferably disposed close to each other, however may be spaced apart from each other by a constant interval, and other arrangements are possible as well.

Meanwhile, one set D' is horizontally and symmetrically disposed at opposite sides of the group C' as a reference in the eighth exemplary embodiment of the present invention. However, depending on the size of the light guide plate 820, a plurality of sets D' may be horizontally disposed at opposite sides of the group C' as a reference. Other arrangements are also possible.

Figure 13A:
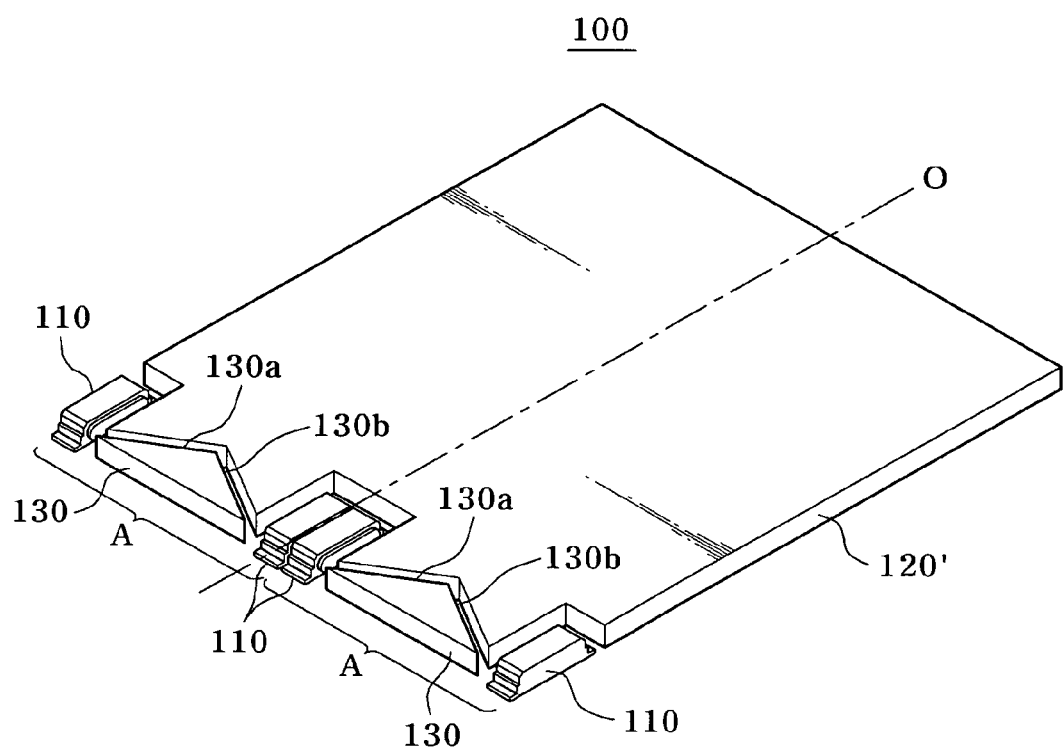
FIGS. 13A and 13B are perspective views of other examples of a light guide plate in accordance with exemplary embodiments of the present invention.
Figure 13B:
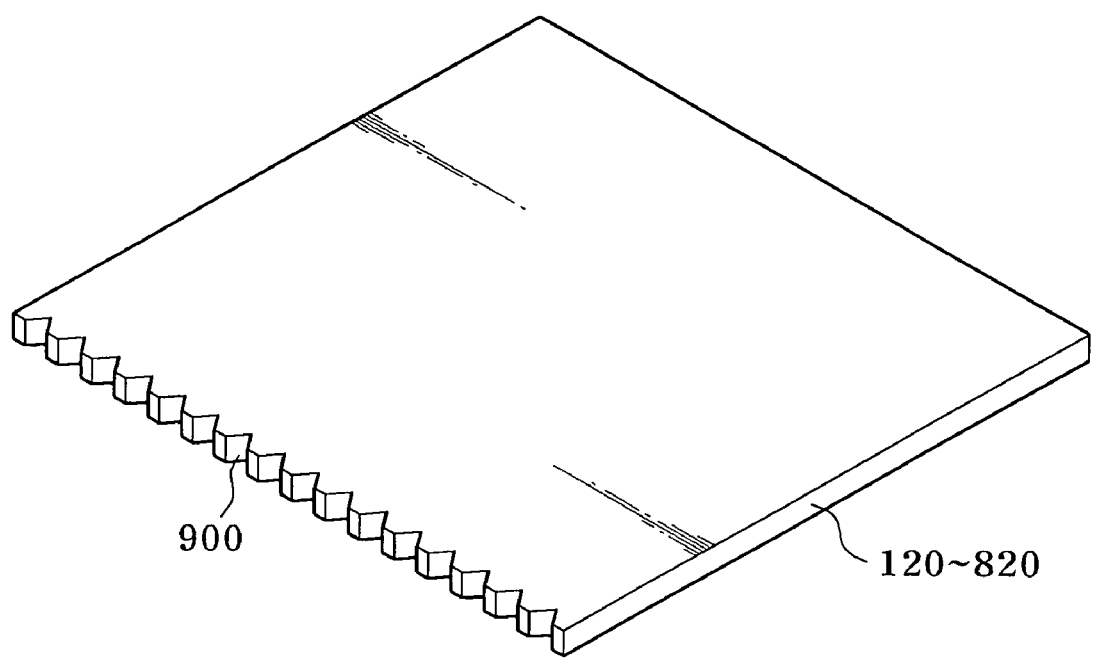

FIGS. 13A and 13B are perspective views of other examples of a light guide plate in accordance with exemplary embodiments of the present invention.

Referring to FIG. 13A, a structure of the light guide plate in the first exemplary embodiment is changed. Here, the same symbols and reference numerals are used for the same constitutional elements as in the first exemplary embodiment.

The light guide plate 120' is more closely disposed to the reflective structure 130, and a portion of the light guide plate 120' in contact with the reflective structure 130 has the same shape as the reflective surfaces 130a and 130b of the reflective structure 130.

Therefore, light emitted from the LEDs 110 can be incident on the light guide plate 120' from a shorter distance and thus can be more effectively prevented from being lost.

The modified light guide plate of FIG. 13A is applied to first exemplary embodiment as an example, but may also be applied to any of the second to eighth exemplary embodiments.

Referring to FIG. 13B, a light receiving surface of the light guide plate (120 to 820) of the first to eighth exemplary embodiments has a plurality of "V"-shaped grooves 900 which are spaced apart from each other by a constant interval to further increase the divergence of light emitted from the LEDs by means of a scattering effect (see LEDs 110 to 810 of FIGS. 2 to 12).

FIG. 14 is a cross-sectional view of other examples of a reflective structure in accordance with exemplary embodiments of the present invention.

Referring to FIG. 14, (a) shows another example of the reflective structures of the first and second exemplary embodiments (130 and 230, see FIGS. 2 and 4), and the first reflective structures of the third and fourth exemplary embodiments (330 and 430, see FIGS. 5 and 7) which has a trapezoidal horizontal cross-section so as not to make ends of the two reflective surfaces (130a and 130b, and 230a and 230b) contact each other.

(b) to (d) of FIG. 14 show that any one of both of the reflective surfaces (130a and 130b, and 230a and 230b) may have a predetermined radius of curvature in the shape of (a) of FIG. 14.

(e) of FIG. 14 shows another example of the second reflective structures of the third to sixth exemplary embodiments (340 to 640, see FIGS. 5 to 9), which has a trapezoidal horizontal cross-section.

(f) of FIG. 14 shows the reflective surface (340a to 640a, see FIGS. 5 to 9) having a predetermined radius of curvature in the shape of (e) of FIG. 14.

(g) and (h) of FIG. 14 show other examples of the first reflective structures 730 and 830 of the seventh and eighth exemplary embodiments, wherein any one of the two reflective surfaces (730a and 730b, 830a and 830b) has a predetermined radius of curvature.

Alternatively, reflective structures having shapes other than (a) to (h) of FIG. 14 may also be formed. For example, the horizontal cross-section of the reflective structure has been described in the exemplary embodiments of the present invention. However, a reflective surface of the reflective structure may be tilted at a constant angle or have a predetermined radius of curvature from the viewpoint of a vertical cross-section.

According to a backlight assembly of an LCD of the present invention as described above, a light guide plate for uniformly guiding light emitted from a plurality of LEDs to a liquid crystal substrate, and a reflective structure having at least one reflective surface titled at a constant angle facing the LEDs are provided. The light emitted from the LEDs is reflected by the reflective structure to have the shape of light emitted from a line light source and be incident on the light guide plate. Thus, hot spots degrading screen quality and screen brightness distribution uniformity can be prevented.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A backlight assembly having a plurality of light emitting diodes (LEDs) and a light guide plate for uniformly guiding light emitted from the LEDs to a liquid crystal substrate, the backlight assembly comprising:

a first reflective structure having at least one reflective surface facing a corresponding LED and tilted at a constant angle and a second reflective structure being independently disposed and spaced a distance from the first reflective structure, wherein each LED is disposed to emit light to a direction substantially perpendicular to a longitudinal bisector of the light guide plate toward each facing reflective surface and none of the LEDs are disposed to emit light to a direction substantially parallel to the longitudinal bisector of the light guide plate, wherein each LED corresponds to a single reflective surface so that the ratio of LEDs to reflective surfaces in the backlight assembly is 1 to 1, wherein the light emitted from each of the LEDs is reflected by the corresponding reflective surface to be incident on the light guide plate in a form of line-shaped light, wherein the backlight assembly includes at least four combinations of a LED and a corresponding reflective surface and the combinations are disposed substantially symmetrically about the longitudinal bisector of the light guide plate, and wherein all of the LEDs are arranged along a common line that extends along a side of the light guide plate, and that common line is substantially perpendicular to the longitudinal bisector of the light guide plate.

2. The backlight assembly of claim 1, wherein a pair of LEDs facing each other and a reflective structure having two reflective surfaces disposed between the LEDs, facing the LEDs, and tilted at a constant angle constitute one group, and at least one group is disposed.

3. The backlight assembly of claim 2, wherein the group is disposed at opposite sides of the longitudinal bisector of the light guide plate as a reference.

4. The backlight assembly of claim 2, wherein the group is disposed so as to make a bisector of the reflective structure of the group match the longitudinal bisector of the light guide plate, and at least one more group is symmetrically disposed at both sides of the group as a reference.

5. The backlight assembly of claim 2, wherein the two reflective surfaces of the reflective structure of the group are in end-to-end contact with each other.

6. The backlight assembly of claim 2, wherein at least one of the two reflective surfaces of the reflective structure of the group has a predetermined radius of curvature.

7. The backlight assembly of claim 2, wherein the tilt angle of the two reflective surfaces of the reflective structure of the group ranges from 30° to 55°.

8. The backlight assembly of claim 2, wherein at least two groups are disposed close to each other.

9. The backlight assembly of claim 2, wherein at least two groups are spaced apart from each other by a predetermined interval.

10. The backlight assembly of claim 1, wherein a light receiving surface of the light guide plate has the same shape as the reflective surface of the first reflective structure and is disposed close to the reflective surface.

11. The backlight assembly of claim 1, wherein a light receiving surface of the light guide plate has a plurality of "V"-shaped grooves which are spaced apart from each other by a constant interval to further increase the divergence of light emitted from the LEDs by means of a scattering effect.

12. A backlight assembly having a plurality of light emitting diodes (LEDs) and a light guide plate for uniformly guiding light emitted from the LEDs to a liquid crystal substrate, the backlight assembly comprising:

one group consisting of a pair of LEDs facing each other, and a first reflective structure having two reflective surfaces disposed between the LEDs, each reflective surface facing one of the LEDs, and being tilted at a constant angle;

one set symmetrically disposed at each of opposite sides of the group as a reference, each set consisting of one LED, and a second reflective structure having a reflective surface tilted at a constant angle, the second reflective structure being independently disposed and spaced a distance from the first reflective structure, wherein each LED corresponds to a single reflective surface so that the ratio of LEDs to reflective surfaces is 1 to 1, wherein each LED is disposed to emit light to a direction substantially perpendicular to a longitudinal bisector of the light guide plate toward each facing reflective surface and none of the LEDs are disposed to emit light to a direction substantially parallel to the longitudinal bisector of the light guide plate, wherein a bisector of the first reflective structure matches the longitudinal bisector of the light guide plate, and light emitted from each of the LEDs is reflected by the corresponding reflective surface to be incident on the light guide plate in a form of line-shaped light, wherein the backlight assembly comprises at least four combinations of an LED and a corresponding reflective surface and the combinations are disposed substantially symmetrically about the longitudinal bisector of the light guide plate, and wherein all of the LEDs are arranged along a common line that extends along a side of the light guide plate, and that common line is substantially perpendicular to the longitudinal bisector of the light guide plate.

13. The backlight assembly of claim 12, wherein the LEDs are disposed to emit light toward the longitudinal bisector of the light guide plate.

14. The backlight assembly of claim 12, wherein the LEDs of the one set are disposed to emit light in the opposite direction to light emitted from the LEDs of the group.

15. The backlight assembly of claim 12, wherein the two reflective surfaces of the reflective structure are in end-to-end contact with each other.

16. The backlight assembly of claim 12, wherein at least one of the two reflective surfaces of the first reflective structure has a predetermined radius of curvature.

17. The backlight assembly of claim 12, wherein the reflective surface of the second reflective structure has a predetermined radius of curvature.

18. The backlight assembly of claim 12, wherein the tilt angle of the reflective surfaces of the first and second reflective structures ranges from 30° to 55°.

19. The backlight assembly of claim 12, wherein the group and the respective sets are disposed close to each other.

20. The backlight assembly of claim 12, wherein the group and the respective sets are spaced apart from each other by a predetermined interval.

21. A backlight assembly having a plurality of light emitting diodes (LEDs) and a light guide plate for uniformly guiding light emitted from the LEDs to a liquid crystal substrate, the backlight assembly comprising:

at least two sets each consisting of an LED and a reflective structure having a reflective surface facing the LED and tilted at a constant angle, at least one set being symmetrically disposed at each of opposite sides of a longitudinal bisector of the light guide plate, wherein the reflective structure of a first set is independently disposed and spaced a distance from the reflective structure of a second set wherein each LED is disposed to emit light to a direction substantially perpendicular to the longitudinal bisector of the light guide plate toward each facing reflective surface and none of the LEDs are disposed to emit light to a direction substantially parallel to the longitudinal bisector of the light guide plate, wherein each LED corresponds to a single reflective surface such that the ratio of LEDs to reflective surfaces is 1 to 1, wherein the light emitted from each of the LEDs is reflected by the corresponding reflective surface to be incident on the light guide plate in a form of line-shaped light, wherein the backlight assembly includes at least four combinations of an LED and a corresponding reflective surface and the combinations are disposed substantially symmetrically about the longitudinal bisector of the light guide plate, and wherein all of the LEDs are arranged along a common line that extends along a side of the light guide plate, and that common line is substantially perpendicular to the longitudinal bisector of the light guide plate.

22. The backlight assembly of claim 21, wherein the LEDs of the set are disposed to emit light toward the longitudinal bisector of the light guide plate.

23. The backlight assembly of claim 21, wherein the LEDs of the set are disposed to emit light in a direction away from the longitudinal bisector of the light guide plate.

24. The backlight assembly of claim 21, wherein the reflective surface of the reflective structure has a predetermined radius of curvature.

25. The backlight assembly of claim 21, wherein the tilt angle of the reflective surface of the reflective structure ranges from 30° to 55°.

26. The backlight assembly of claim 21, wherein the sets are disposed close to each other.

27. The backlight assembly of claim 21, wherein the sets are spaced apart from each other by a predetermined interval.

* * * * *